Dec. 31, 1940.                    W. H. NOELTING                    2,227,271
                              CASTER SOCKET STRUCTURE
                                Filed Feb. 2, 1939
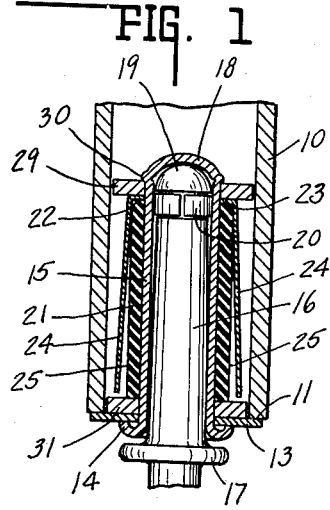
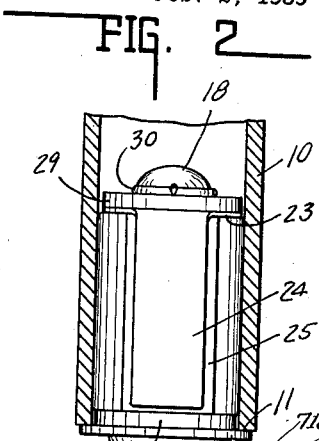
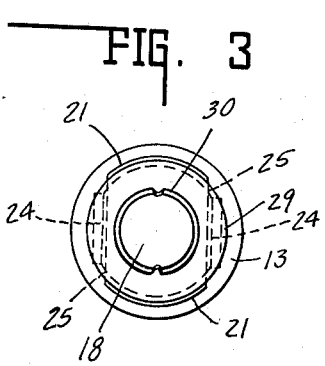
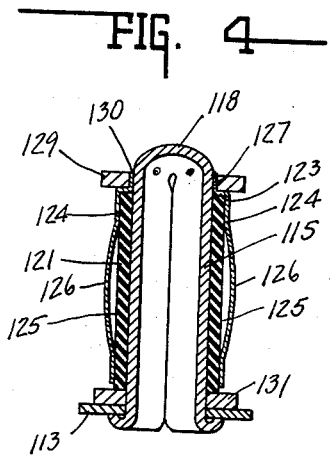
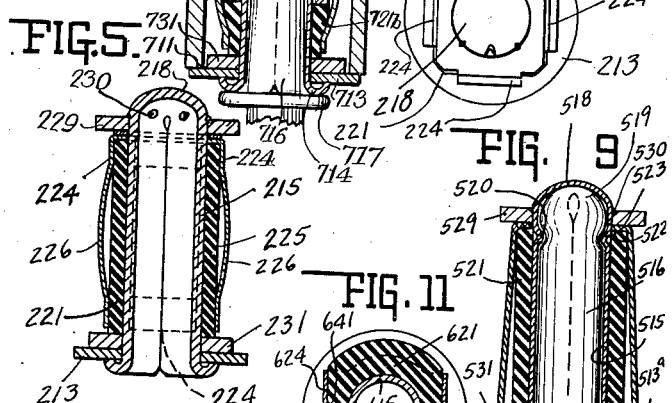
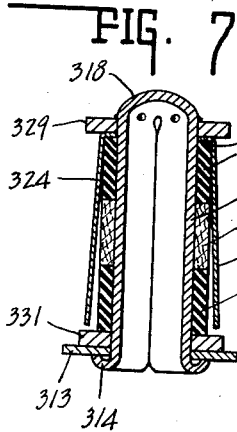
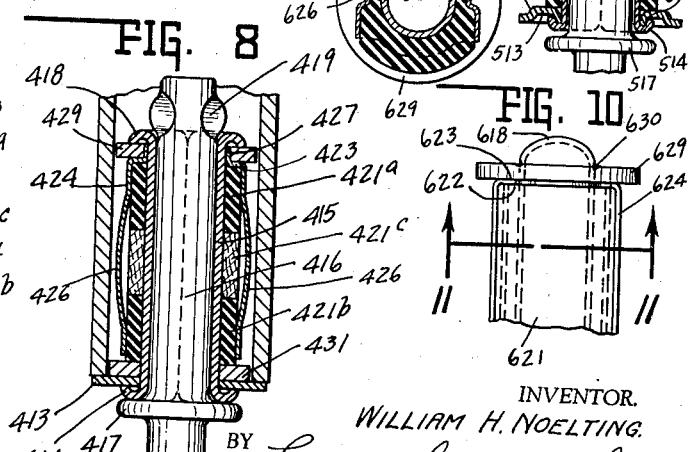
INVENTOR.
WILLIAM H. NOELTING.
BY Lockwood, Goldsmith & Galt,
ATTORNEYS.

Patented Dec. 31, 1940

2,227,271

UNITED STATES PATENT OFFICE 2,227,271

CASTER SOCKET STRUCTURE

William H. Noelting, Evansville, Ind., assignor to Faultless Caster Corporation, Evansville, Ind., a corporation Application February 2, 1939, Serial No. 254,219

6 Claims. (Cl. 16—43)

This invention relates to a spring cushion socket for casters.

The invention is readily susceptible to inclusion as an independent socket for tubular leg mounting and adapted to detachably support a caster structure. It is also equally adapted to inclusion in a permanent combination caster and socket structure adapted for reception by and retention within a tubular leg.

The chief object of this invention is to produce a spring cushion socket which is readily insertable into a tubular leg which includes a plurality of spring arms for leg interior engagement and which arms are supported by an interior cushion like arrangement and which structure when desired, may be provided with a top centering arrangement and which structure, if desired, may be provided with a lower shock absorbing construction.

The chief feature of the invention consists in providing a socket structure which inherently includes a tubular, stem receiving and supporting interior tubular arrangement, a leg supporting plate carried thereby, an intermediate yielding or semi-yielding spring arm spacing structure and a spring arm arrangement exteriorly thereof for tube interior engagement.

Other objects and features of the invention will be set forth more fully hereinafter.

The full nature of the invention will be understood from the accompanying drawing and the following description and claims.

In the drawing, Fig. 1 is a vertical sectional view through one embodiment of the invention, the socket being shown of the detachable caster supporting type and mounted within a leg tubular structure, the latter being shown in central section and that portion of the caster illustrated being shown in elevation.

Fig. 2 is a side elevational view of the socket shown in Fig. 1, the leg being shown in section.

Fig. 3 is a top plan view of the socket shown in Fig. 2.

Fig. 4 is a central sectional view through a modified form of socket similar to that shown in Figs. 1 to 3 inclusive.

Fig. 5 is a view similar to Fig. 4 and of a still further modified form of the invention.

Fig. 6 is a top plan view of the modified form shown in Fig. 5.

Fig. 7 is a view similar to Figs. 1, 4 and 5 and of a still further modified form of the invention.

Fig. 8 is a view similar to Fig. 1 and of a modified form of the invention, illustrating its application to a so-called permanent socket and caster combination.

Fig. 9 is a view similar to Fig. 1 and of a modified form of the invention.

Fig. 10 is an elevational view of the upper portion of a still further modified form of the invention.

Fig. 11 is a transverse sectional view thereof taken on line 11—11 of Fig. 10 and in the direction of the arrows.

Fig. 12 is a central sectional view of the elected species embodying the invention.

In Figs. 1 to 3 of the drawing, 10 indicates a tubular leg, the lower end 11 of which is adapted to bear upon a track plate 13. The latter bears on the upwardly and outwardly directed flange portion 14 of a tubular stem receiving portion 15. Within the same is mounted a caster stem 16 having an enlarged portion 17. The upper end of this tubular portion 15 is closed as at 18 and the upper end of the stem may be suitably formed as at 19 for top bearing purposes. On the stem may be mounted a split retain-band 20 common to detachable casters, it being understood that upon insertion of the stem within the tubular portion 15 the stem is yieldingly retained therein by the band and if desired, this band may be so associated with the stem so that the stem then may freely rotate within the socket or the association may be such that the stem may be nonrotatively associated with the socket, in which event the swivel action would be obtained through the yoke and like construction, nor shown herein, all of which is old in the caster art and is not pertinent to the present invention.

Enveloping the exterior tubular portion 15 is a tubular spacing structure 21. This spacing structure may be of fabric, felt or any other suitable material and one material found quite satisfactory is a rubber sleeve.

Supported upon the upper end 22 thereof, is a central portion 23 of a spider structure, herein shown provided with two spring arm portions 24. As illustrated in Figs. 2 and 3, the rubber sleeve which may be of extruded character, is flattened as at 25 so that the spring arms nest within the space formed by said flattening from a true cylindrical shape. It, of course, is to be understood that the number of flattened faces correspond to the number of spring arms employed. Usually two are sufficient. However, three or more may be utilized, Figs. 5 and 6 showing the utilization of four spring arms.

Superimposed above the central portion 23 of the spring arm spider structure and constituting a retainer therefor, there may be provided a washer 29 and the same may be press-fitted upon the inner tubular structure 15 or the head of the socket may be enlarged outwardly and laterally thereover or the washer may be indented so as to engage in the metal of the socket, as indicated at 30, thereby uniting all of the elements together. The washer 29 prevents upward movement of the arms and sleeve upon socket insertion in the sleeve.

In one form of the invention at the lower end of the resilient sleeve 21, there may be provided a thrust washer 31. This socket enters the tube quite freely because the spring arms serve in effect as a slip guide and thus initial entrance into the tubular leg is quite easily effected. Continued movement of the socket inwardly into the leg causes the spring arms to move toward the axis of the socket which in turn will cause the rubber sleeve to be forced outwardly throughout the outer cylindrical part of the same and where the rubber is exposed to the interior surface of the leg. This builds up more pressure upon the interior of the leg so that the holding force of this socket is materially greater than that of the spring arm structure per se. Furthermore, such a rubber sleeve structure is of sound deadening character and furthermore, such rubber sleeve structure incorporates a cushioning feature. Also, the aforesaid sleeve construction serves as a support for undue collapse of the spring arms previous to insertion in the socket and thus the initial force of the arms is retained therein until utilization for socket mounting.

It will be noted also the spring arm structures terminate adjacent the track plate but above the same and above the bottom washer if the same be employed. It readily will be understood that the bottom washer 31 may be omitted. However, this washer is utilized to absorb shock, if employed.

Reference now will be had to Fig. 4. In this form of the invention, numerals of the one hundred series indicate like or identical parts. The chief characteristic of this embodiment of the invention is in the spring frame structure. It will be observed that surrounding the aperture in the spring frame structure is an upwardly directed collar portion 127 and each of the arms 124 intermediate its ends is bowed outwardly at 126. This type of socket is peculiarly effective for adaptation to tubular legs which are slightly oversize so far as their internal diameter is concerned. In this form of the invention, the lower washer 131 prevents lateral play of the socket in the tubular leg and at the lower end thereof. It also constitutes a shock absorber. The upper washer 129, if utilized, serves as an upper spacer to prevent undue lateral movement of the upper end of the socket. All of the other parts of the socket structure cooperate in substantially the same manner as that previously described with reference to the form of the invention shown in Figs. 1 to 3, inclusive.

It will be quite apparent that the collar 127 may be utilized in the form of the invention shown in Fig. 1. Also, either or both of the upper and lower washers, which preferably are of approximately the same diameter, may be omitted or utilized as desired. If washer 129 is utilized, it is anchored to the stem receiving tubular portion 115 in any suitable manner, such as indicated at 130.

In Figs. 5 and 6, a further modified form of the invention is illustrated and numerals of the two hundred series indicate like or similar parts. The chief distinguishing characteristic of this form of the invention resides in the spring frame structure and as illustrated more particularly in said figures, the same is herein shown as including a dual spider provided with four spring frame arms. Herein the arms are illustrated as bowed. They may, however, be straight. In this form of the invention, the lower washer 231 may or may not be utilized, as desired. The spider structure shown herein includes two strips at right angles to each other. This economizes on material over a single four-arm structure.

In Fig. 7 there is illustrated a modified form of the invention and numerals of the three hundred series indicate like or similar parts. This embodiment of the invention is illustrated in the manner that the embodiment shown in Figs. 1 to 3 is illustrated. Herein the chief characteristic distinction consists in providing that the intermediate sleeve means is comprised of an upper and lower cushion sleeve structure 321a and 321b and an intermediate, more resistant structure 321c. The latter may be of wood, for example. The purpose of having the upper and lower ends of this sleeve structure more resilient than the intermediate portion is to insure the spreading or wedging action at the top and bottom of the socket structure when engaged with the interior of the tubular leg and incident to the entrance of the socket into said leg.

It, of course, will be understood either form of spring arm structure shown in Figs. 4 or 5 might be utilized in place of that illustrated in Fig. 7. Furthermore, if the spring arm structure shown in Figs. 5 and 6 were utilized instead of the single pair arm means, instead of two diametrically flattened portions of the intermediate sleeve structure, the same would include four quadrant positioned flattened portions. In this event the cushion expansion of the said sleeve means at the top and bottom thereof, if the arms be arched, would be between the adjacent edges of adjacent arms. All of the foregoing relates to a socket structure per se adapted to detachably support a caster. Extension 330 in the inner tube, lock the washer 329 to the tube.

Reference now will be had to Fig. 8. Herein numerals of the four hundred series indicate like or equivalent parts. Inasmuch as the spring frame structure has been shown of various forms, and the intermediate sleeve portion has been shown of modified form, the present showing of this permanent combination structure is one wherein the more complicated forms of each are embodied for illustration only. This form of the invention primarily differs from that shown in Figs. 1 to 7, inclusive, in that the upper end of the inner tubular member 415 instead of providing a top bearing as at 18—see Fig. 1—is turned outwardly as at 418 and overlies the upper washer 429 as well as the upwardly directed collar portion 427 of the spider structure, if said collar is employed. If the collar be not employed, then the washer need not be utilized, and then the outwardly directed flared portion 418 bears on the plate portion 423 of the spider structure. In this form of the invention, the upper end of the stem 416 is enlarged laterally as at 419 and thus the caster is permanently connected to the socket structure.

In all of the aforesaid forms of the invention, the action is substantially the same as that set forth initially hereinbefore and, therefore, no further detailed description of the modification of each of the several forms of the invention illustrated in Figs. 4 to 8, inclusive, is believed necessary, since the distinguishing characteristics of each of these modified forms has been set forth quite fully.

In Fig. 9 numerals of the five hundred series indicate parts like or similar to parts in Fig. 1 indicated by primary numerals. Herein the stem 516 with enlargement 517 has the reduced neck portion near its upper rounded end 519. Socket or inner tubular member 515 having top bearing portion 518 is suitably indebted at 520 to retain the stem in the tubular member.

The lower end of the tubular member 515 is turned outwardly as at 514 to bear upon the under face of an offset track plate 513, the latter being offset at 531. The central portion of the plate nests within the tube and absorbs the side thrust in the same manner as the lower washer 31, see Fig. 1. The plate may have the downturned collar 513ª.

The rubber sleeve 521 is embraced, as it were, by spring arms 524 carried by spider portion 523 supported by upper end 522 of sleeve 521. Washer 529 is suitably secured to the inner tubular member 515 as at 530.

In Figs. 10 and 11 is illustrated a further modified form of the invention wherein numerals of the six hundred series are employed: This form of the invention basically differentiates from those illustrated and previously described in that the springs 624 are bowed transversely as at 626 and the rubber sleeve 621 is complementarily grooved as 641.

In Fig. 12 there is illustrated in central section the elected species embodying the invention. Numerals of the seven hundred series indicate parts like or similar to parts designated by corresponding numerals in the other figures. Herein, this species includes the top bearing type of socket and frame connection as illustrated in Fig. 4, the sectional resilient arrangement as shown in Fig. 8 and the interlocking arm and resilient arrangement as shown in Fig. 11.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a caster socket structure for insertion into and retention by the interior of a tubular leg and the like for the support of a caster and including an apertured leg supporting plate, a caster stem receiving elongated tubular member aligned therewith and operatively connected thereto and an upper spacer carried by the member, the combination of resilient means of slightly less cross-section area than that of the leg interior substantially enveloping the major length of the tubular member and operatively bearing at its upper end upon the spacer, and longitudinally directed spring arms exteriorly positioned adjacent the sleeve means which substantially fills the space between the arms and tubular member, said arms and sleeve means having engagement with the leg interior for facilitating socket insertion and initial retention therein, said arms laterally compressing the sleeve means for sleeve means lateral expansion at other than the compressed portion for gripping of the leg interior for socket retention therein.

2. A socket structure as defined by claim 1, and characterised by the arms having a longitudinally inwardly directed portion the sleeve means being reduced longitudinally adjacent that arm portion seating the same facilitate socket insertion in the leg.

3. A socket structure as defined by claim 1, characterized by the elongated arms being bowed outwardly from the sleeve means and intermediate the length of said arms.

4. A socket structure as defined by claim 1, characterized by the spring arms having a common connection forming an apertured spider interposed between the sleeve means and the spacer, said tubular member being seated in the spider aperture.

5. A socket structure as defined by claim 1, characterized by the spring arms having a common connection forming an apertured spider interposed between the sleeve means and the spacer, said tubular member being seated in the spider aperture, and a collar arrangement defining the spider aperture and interposed between the spacer and tubular member.

6. A caster socket structure including a stem receiving tubular means, sleeve means thereabout, and resilient at one end, leg supporting means operatively connected to the lower end of the tubular means for leg support, and a plurality of elongated spring arms exteriorly of the sleeve means and operatively connected to the tubular means adjacent the resilient end of the sleeve means, said arms when nested in a tubular leg forcing said resilient end into leg engagement.

WILLIAM H. NOELTING.